United States Patent

[11] 3,580,451

| [72] | Inventor | Raimund Fraitzl<br>Tengling, Upper Bavaria, Germany |
|---|---|---|
| [21] | Appl. No. | 859,027 |
| [22] | Filed | Sept. 18, 1969 |
| [45] | Patented | May 25, 1971 |
| [73] | Assignee | Bruckner-Maschinenbau Gernot Bruckner<br>Tittmong, Upper Bavaria, Germany |
| [32] | Priority | Oct. 8, 1968 |
| [33] | | Germany |
| [31] | | G6801212.4-7501 |

[54] CLAMP BLOCK CHAIN FOR HOLDING ONE EDGE OF A WEB OF MATERIAL
4 Claims, 1 Drawing Fig.
[52] U.S. Cl................................................. 226/173, 198/180
[51] Int. Cl......................................................... B65h 17/34
[50] Field of Search.......................................... 226/170– 172; 271/179; 198/180, 74/(Inquired)

[56] References Cited
UNITED STATES PATENTS
3,323,703  6/1967  Wibbing et al................ 226/173

*Primary Examiner*—Richard A. Schacher
*Assistant Examiner*—Gene A. Church
*Attorney*—Marshall & Yeasting ABSTRACT: A clamp block chain comprises a series of clamp blocks, interconnected to form a chain, for holding one edge of a web of material. A series of upper rollers and a series of lower rollers are mounted on the chain to rotate on vertical axes. The upper rollers run between an upper pair of vertical guides, and the lower rollers run between a lower pair of vertical guides. A series of supporting rollers, mounted on the chain, rotate on horizontal axes, and there is a horizontal rail on which the supporting rollers run.

PATENTED MAY25 1971  3,580,451
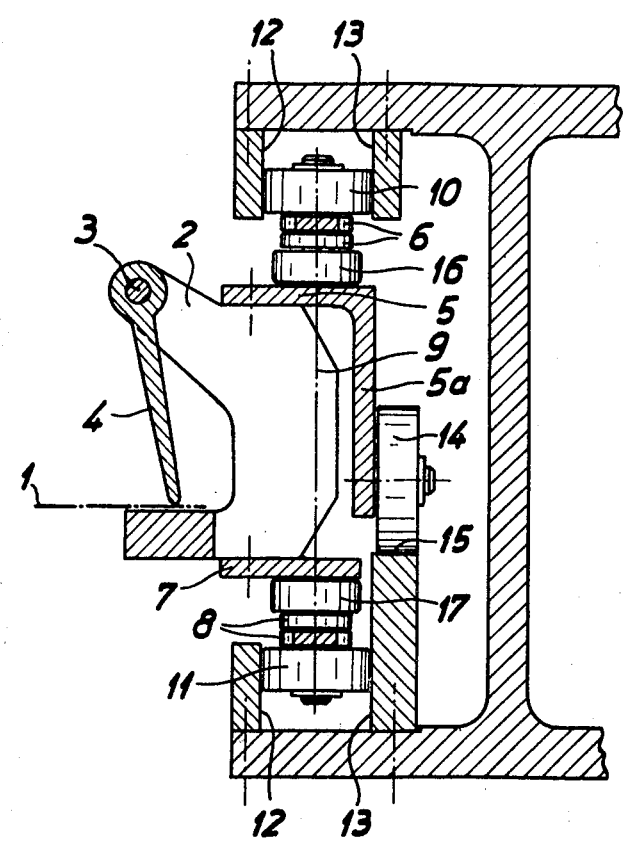

3,580,451

CLAMP BLOCK CHAIN FOR HOLDING ONE EDGE OF A WEB OF MATERIAL

BACKGROUND OF THE INVENTION

This invention relates to a clamp block chain, wherein upper and lower rollers rotatable about vertical axes are provided for horizontal guidance of the clamp blocks interconnected in chain fashion.

In known clamp block chains of the above type, the vertical guidance and support of the clamp blocks is provided by guide surfaces provided on the clamp block bodies and supported on fixed guide rails. Because of the appreciable weight of the clamp blocks and their supporting roller chains and because of the frequent high operating speeds, considerable wear occurs at the metallic guide surfaces used for vertical guidance and support of the clamp blocks. This involves the danger of metallic particles possibly reaching the web of material transported by the clamp block chain, which can be extremely undesirable with sensitive material, e.g. plastic foils.

SUMMARY OF THE INVENTION

The object of the invention is therefore to provide a clamp block chain of the type described which avoids this disadvantage.

According to the invention, this object is achieved in that rollers rotating about horizontal axes are provided for vertical guidance and support of the clamp blocks. In this manner the wear of the elements used for vertical guidance and support can be reduced to a minimum. The construction provided by the invention also enables very high weights to be supported by the clamp block chain.

Clamp block chains are usually driven by chain wheels, which in known constructions engage between the upper and lower guide rollers used for horizontal guidance of the clamp blocks. This type of construction has the defect that the still-rotating upper and lower guide rollers first have to be braked on contact with the chain wheels (in the reversal zone of the clamp block chain), and on leaving the chain wheels have to be accelerated again on renewed contact with the fixed guide surfaces, and this increases the wear on the relatively movable parts.

To avoid these defects, a preferred embodiment of the invention provides, on the vertical shafts carrying the upper and lower guide rollers, separate rotary elements, either firmly affixed to the vertical shafts or rotatable relative thereto, for engaging the chain wheels.

In this manner, since the chain wheels are not in contact with the upper and lower guide rollers, the latter can freely slow down in the clamp-block-chain-reversing zones. This avoids the wear associated with rapid slowing down and rapid acceleration of these guide rollers.

The rollers used for vertical guidance and support of the clamp blocks and rotating about horizontal axes can be directly supported on the clamp block body. Alternatively, according to a suitable further development of the invention, individual brackets carried by the clamp blocks may have an angled projection on which is supported a guide roller rotating about a horizontal axis.

BRIEF DESCRIPTION OF THE DRAWING

The drawing is a vertical section of a device embodying the invention.

DESCRIPTION OF THE PREFERRED EMBODIMENT

The clamp block chain used for conveying a web of material 1 comprises a number of a clamp blocks consisting in general of a clamp body 2 and a clamp 4 pivotable about a shaft 3.

The individual clamp blocks are jointedly interconnected by plates 6 and 8.

At the individual joint positions the clamp body 2 has a vertical shaft 9 carrying upper and lower guide rollers 10 and 11. These guide rollers 10, 11 thus rotate about a vertical axis and are in contact with fixed vertical guides 12, 13.

The plate 5, carried by the clamp block is provided with a downwardly bent projection 5a on which is mounted a supporting roller 14 rotatable about a horizontal axis. This roller is supported on a fixed guide rail 15. The weight of the clamp block chain is thus taken by the supporting rollers 14 and the guide rail 15.

Between the upper or lower guide roller 11, 10 on the one hand and the clamp block body 2 on the other hand, there are mounted on the vertical shaft 9 two auxiliary rollers 16, 17, which engage the chain wheels used for driving the clamp block chain, in the reversal zone of the chain.

I claim:

1. A clamp block chain comprising a series of clamp blocks, interconnected to form a chain, for holding one edge of a web of material, a series of upper rollers and a series of lower rollers, all mounted on the chain to rotate on vertical axes, an upper pair of vertical guides between which the upper rollers run, a lower pair of vertical guides between which the lower rollers run, a series of supporting rollers mounted on the chain to rotate on horizontal axes, and a horizontal rail on which the supporting rollers run.

2. A clamp block chain according to claim 1, comprising a series of vertical shafts which are carried by the chain, and each of which carries one of the upper rollers, one of the lower rollers, and a pair of auxiliary rollers for engaging wheels for driving the chain, the auxiliary rollers being rotatable relative to the upper and lower rollers.

3. A clamp block chain according to claim 2, wherein one of the auxiliary rollers is located adjacent to each of the upper and lower rollers, between such roller and an adjacent clamp block.

4. A clamp block chain according to claim 1, wherein each of the supporting rollers is rotatably mounted on a bracket carried by one of the clamp blocks.